(12) United States Patent
King et al.

(10) Patent No.: US 7,508,756 B2
(45) Date of Patent: Mar. 24, 2009

(54) METHOD AND SYSTEM FOR DECREASING ROUTING LATENCY FOR SWITCHING PLATFORMS WITH VARIABLE CONFIGURATION

(75) Inventors: Steve King, Portland, OR (US); Chiayin Mao, Beaverton, OR (US); Thomas W. Bucht, Hillsboro, OR (US)

(73) Assignee: Crossroads Systems, Inc., Austin, TX (US)

( * ) Notice: Subject to any disclaimer, the term of this patent is extended or adjusted under 35 U.S.C. 154(b) by 591 days.

(21) Appl. No.: 11/091,151

(22) Filed: Mar. 28, 2005

(65) Prior Publication Data

US 2005/0180409 A1    Aug. 18, 2005

Related U.S. Application Data

(63) Continuation of application No. 09/707,443, filed on Nov. 7, 2000, now Pat. No. 6,922,391.

(60) Provisional application No. 60/202,716, filed on May 8, 2000.

(51) Int. Cl.
    *H04L 12/26* (2006.01)
(52) U.S. Cl. ............... 370/229; 370/359; 370/360; 370/386; 370/395.1; 370/449
(58) Field of Classification Search .......... None
    See application file for complete search history.

(56) References Cited

U.S. PATENT DOCUMENTS 5,862,338 A * 1/1999 Walker et al. ............... 709/224

6,574,667 B1 * 6/2003 Blumenau et al. ........... 709/229
6,625,121 B1 * 9/2003 Lau et al. .................... 370/230
6,715,023 B1 * 3/2004 Abu-Lebdeh et al. ....... 710/317

FOREIGN PATENT DOCUMENTS

EP    0 869 641 A2    10/1998
WO    WO 99/41862    8/1999

* cited by examiner

*Primary Examiner*—Firmin Backer
*Assistant Examiner*—Roberta A Shand
(74) *Attorney, Agent, or Firm*—Sprinkle IP Law Group (57) ABSTRACT

A method for decreasing routing latency of a switching platform comprises identifying ports which have changed their operational state and modifying the port polling code associated with the respective ports so that operational ports are polled for frames to be routed, while non-operational ports are not polled. In one embodiment, the method is implemented in a fiber channel switch. Non-operational ports are identified as having operational states below a pre-determined threshold level of functionality. The polling code for the ports is modified while polling operations are carried out in the switch. The code for a newly operational port is modified by copying into the code one or more instructions that poll the port for a frame and routes the frame. The code for a newly non-operational port is modified by copying into the code a branch instruction that bypasses the remainder of the polling code for the port. The frame routing latency of the switch is reduced because ports which are non-operational and will not produce frames are not polled.

17 Claims, 6 Drawing Sheets

```
        _fast4_port0:
            ld              _Port0Hdr, r8
255         bbc.t           SOF_VLD, r8, _fast4_port1
            cmpobge.t       r8, r4, four_port0_c23
            cmpobge.t       r8, r5, four_port0_non_fastc2
        four_port0_c_entry:
            st              r8, _LastFrameHeader
260         mov             0, g0
            callx           _FastBranch
            b               _fast4_port1
        four_port0_non_fastc2:
            st              r8, _LastFrameHeader
265         mov             0, g0
            callx           _HandleNonFastClass2Frame
            b               _fast4_port1
        four_port0_c23:
            ld              _CamResultReg, r9
270         bbc.f           BIT_FC2, r9, four_port0_c_entry
            st              r9, _Port0Dest
```

Fig. 3

```
/* now we copy the code for this port */
destp = (unsigned long*)FastLoopPortPointer[port];
srcp = (unsigned long*)(FastLoopMachineCodeBuff + (destp - (unsigned long*)FastL
for(; destp < FastLoopPortPointer[port+1]; destp++, srcp++)
{
    *destp = *srcp;
}

/* invalidate the i960 instruction cache */
write_icctl(2);
```

Fig. 4

```
/* point to where the 'branch' instruction is to be written */
destp = (unsigned long*)FastLoopPortPointer[port];

/* compute the offset */
distance = ((unsigned long*)FastLoopPortPointer[port+1]) -
           ((unsigned long*)FastLoopPortPointer[port]);

/* 0x08 is the machine code for branch. the lower 24 bit is the offset */
*destp = 0x08000000 | (distance * 4);

/* invalidate the i960 instruction cache */
write_icctl(2);
asm("setbit 18, sf4, sf4");
```

METHOD AND SYSTEM FOR DECREASING ROUTING LATENCY FOR SWITCHING PLATFORMS WITH VARIABLE CONFIGURATION

CROSS-REFERENCE TO RELATED APPLICATION

This application is a continuation of, and claims a benefit of priority under 35 U.S.C. 120 of the filing date of U.S. patent application Ser. No. 09/707,443 by inventors Steve King, et al. entitled "Method and System for Decreasing Routing Latency for Switching Platforms with Variable Configuration" filed on Nov. 7, 2000 now U.S. Pat. No. 6,922,391, which in turn claims the benefit of priority under 35 U.S.C. § 119 to provisional patent application No. 60/202,716 filed May 8, 2000, the entire contents of which are hereby expressly incorporated by reference for all purposes.

TECHNICAL FIELD OF THE INVENTION

The present invention relates in general to the field of electronic devices, and more particularly, to a method and system for decreasing routing latency for switching platforms with variable configuration.

BACKGROUND OF THE INVENTION

In a switching platform, frames arrive from source ports and must be transferred to appropriate destination ports. Transferring a frame from a source port to a destination port typically requires the participation of some central routing authority, such as a central processing unit. This participation can take a form where the central processing unit (CPU) must poll each port in turn, checking for possible frames to route. Furthermore, a switching platform may allow for a configuration that restricts the possible source ports to some maximum possible set. In such an instance, the CPU may spend unnecessary cycles polling ports which never produce a frame to route. These unnecessary cycles increase frame routing latency, which is a key metric of switch performance.

A need has arisen for a method and system which improves the operation of a central routing authority, such as a CPU, in routing a frame from a source port to a destination port.

A need exists for a method and system that avoids the requirement for the CPU to poll each port in sequence, to check for possible frames to route.

A further need exists for a method and system that avoids the need to spend unnecessary cycles in polling ports which will never produce a frame to route.

There is a need for a method and system that avoids the performance of unnecessary cycles during the polling of ports for the purpose of decreasing the frame routing latency.

A problem with SCSI is that it is not a switchable protocol. The fibre channel protocol, on the other hand, is a switchable protocol. Using fibre channel technology, it is possible to implement switches which direct data to the appropriate destinations.

A key metric of how well a switch operates is the speed with which it routes frames. Speed is one of the greatest advantages of fibre channel systems. The present invention reduces the amount of time it takes to route a frame and is therefore ideal for implementation in fibre channel systems. When any individual frame comes into a switch, the present invention requires less time for the switch to decide how to direct the individual frame.

SUMMARY OF THE INVENTION

In accordance with present invention, a method and system are provided that may substantially reduce or even eliminate some of the disadvantages and problems associated with the previously developed method for polling ports on switching platforms that have the effect of decreasing routing latency for switching platforms that exhibit variable configurations.

According to one aspect of the invention, a method for decreasing routing latency of a switching platform in a fibre channel network is provided. This method comprises first identifying at least one port from a set of ports on the fibre channel network. This at least one port is identified as a function of having a link state below a pre-determined threshold state. The pre-determined threshold state is established according to at least one port being in an operational state. The method further includes modifying port-controlling instructions associated with the at least one port to reflect the operational state of the at least one port. Furthermore, the process includes operating the switching platform according to the modified port-controlling instructions for reducing polling of the set of ports. This is done by polling only the ones of the set of ports that are indicated as being above the threshold state.

One technical advantage of the present system is that it may avoid unnecessary cycles in polling ports that do not produce frames to be routed. The present system identifies and skips those ports that do not produce frames to be routed.

Another technical advantage of the present invention is that it overcomes the prior art's methods of compiling in advance firmware versions to skip uninstalled ports. The present invention may therefore avoid the problem of the higher engineering overhead involved in maintaining many variants of the firmware, which is inherent in advanced firmware version compilation. Another problem with this prior art approach is that it hinders field upgrades, in that the firmware must be updated in sync with configuration changes at the customer site.

Another technical advantage of the present invention is that it may decrease frame routing latency by avoiding unnecessary queries of unused ports.

Another technical advantage of the present invention is that it may allow the switching platform to seamlessly and automatically reconfigure itself to accommodate changes in customer configuration or routing environment.

Yet another technical advantage of the present invention is that it may allow a single source code base. This minimizes sustaining engineering efforts (for example, by avoiding the problem of updating the firmware in sync with configuration changes at the customer site and eliminating problems with field upgrades of systems.)

BRIEF DESCRIPTION OF THE DRAWINGS

For a more complete understanding of the present invention and the advantages thereof, reference is now made to the following description taken in conjunction with the accompanying drawings in which like reference numerals indicate like features, and further wherein.

DETAILED DESCRIPTION OF THE INVENTION

Preferred embodiments of the present invention are illustrated in the figures, like numerals being used to refer to like and corresponding parts of the various drawings.

At a high level, there is a Central Processing Unit (CPU) inside the switch that queries or polls the ports of the switch. This query identifies whether there are frames that need to be routed from the individual ports to other ports in the switch. The ports which may have frames awaiting routing are sequentially examined by the CPU. When the switch finds a frame that needs to be routed, it performs a series of instructions that direct the hardware to route the frame from the current port to another of the ports. For example, a switch may first look at port 0 to determine whether there are any frames at port 0 that need to be routed. If there is a frame waiting at port 0, it will execute a corresponding set of instructions which will cause the switch hardware to route the frame. If there is no frame waiting at port 0 to be routed, the CPU will examine the next port (e.g., port 1) to determine whether it has any frames to be routed. After port 1 is examined, the next port will be examined, and so on, until port 0 is examined again.

While the switch's CPU is examining a particular port, it is not looking at any other ports. Consequently, if there are frames waiting on any other ports, these frames will not be detected until the CPU polls those ports. If there is a frame ("frame A") waiting at the port immediately preceding the port that is currently being polled, frame A will not be detected until all of the other ports which may have frames are polled to determine whether they actually have frames that need to be routed. Even if none of the other ports have frames that need to be routed, frame A will not be detected until all of the other operational ports have been polled. Time which is spent unnecessarily polling ports increases the latency in routing frame A, thereby degrading the performance of the switch. The longer the list of ports that have to be polled, the greater the routing latency. The present system allows the routing latency to be reduced by eliminating the polling of ports that the system knows will not have frames to be routed.

This is accomplished by modifying the control code associated with one or more of the ports. If a port is identified as being operational, the control code is not modified. (It is assumed here that the control code is initially configured to poll each one of the ports.) If, on the other hand, a port is identified as being non-operational, it will not have any frames to be routed, so the control code is modified to skip the instructions that comprise the polling operation for this port. Conversely, the system may be configured to identify ports that, although formerly identified as non-operational, become operational and may therefore have frames that need to be routed. The control code is therefore modified so that instructions which poll the now-operational port are executed. It should be noted that the system is not necessarily restricted to modifications which include ports or to modifications which exclude ports—both types of code modifications can be made in the same system.

Figure 1:
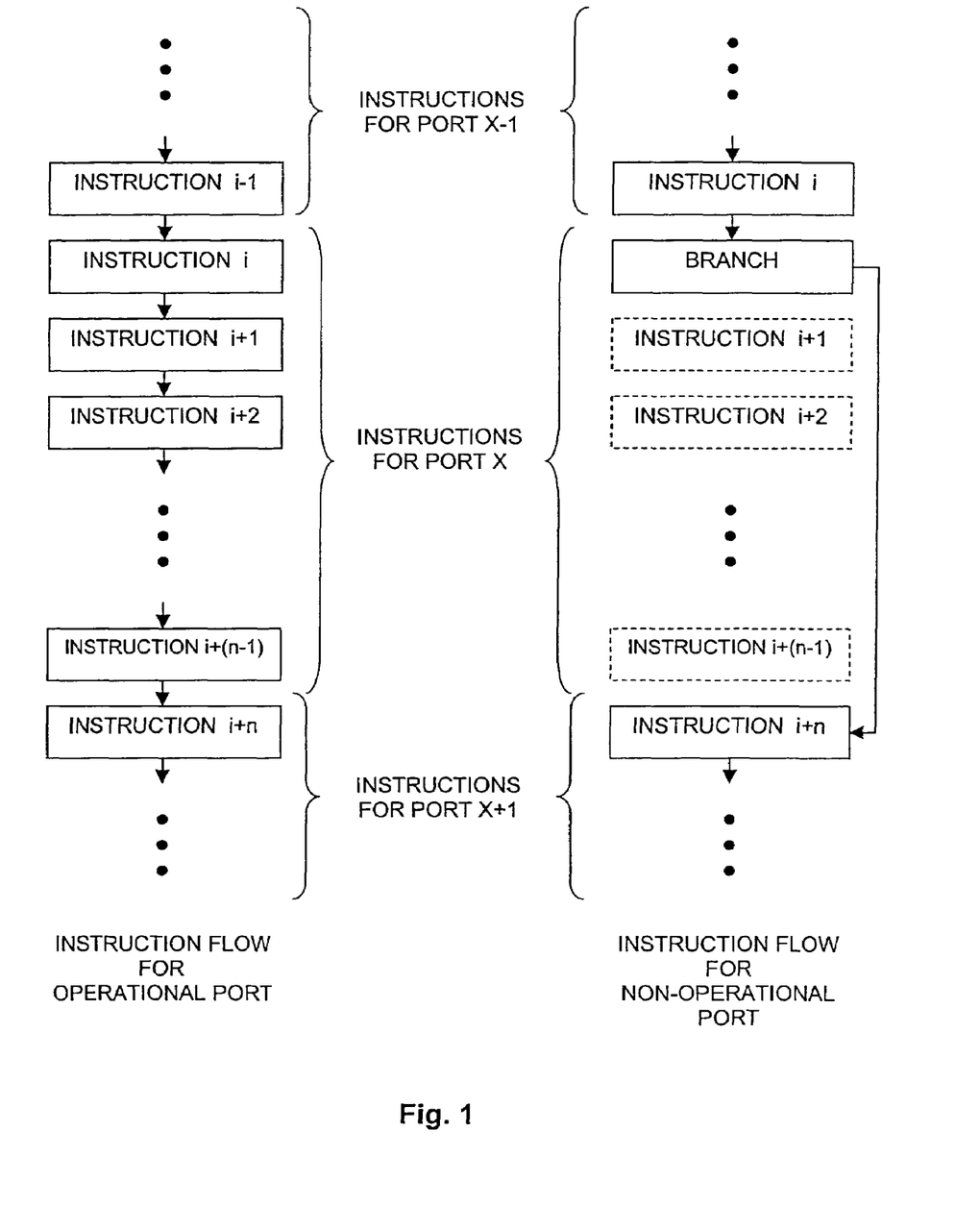
FIG. 1 is a diagram illustrating the instructions executed by the CPU in the polling operation.

Referring to FIG. 1, a diagram illustrating the instructions executed by the CPU in the polling operation is shown. The left side of FIG. 1 shows the instructions that are executed when port X is operational, while the right side of FIG. 1 shows the instructions that are executed when port X is non-operational.

Port X is the port of interest in a particular switch. It is assumed that there are a plurality of ports in the switch, including ports X−1, X and X+1. Referring to the left side of FIG. 1, all three of ports X−1, X and X+1 are operational. Consequently, each of these ports must be polled to determine whether it has frames that need to be routed. In this example, port X is polled by executing instructions i through i+(n−1). (Similarly, port X−1 is polled by the execution of one or more instructions ending with instruction i−1, and port X+1 is polled by the execution of one or more instructions beginning with instruction i+n.)

As is apparent from FIG. 1, the CPU executes the instructions sequentially, executing instruction i, then instruction i+1, and so on. After the polling instructions for each of the ports has been executed, the process is repeated and the instructions are executed for a second time, then a third time, and so on, so that the ports are repeatedly polled in sequential order (except that some ports may be skipped, as described in more detail below).

Concurrently with the execution of the polling instructions shown in FIG. 1, the system monitors the ports to identify any changes in their respective operational states. That is, the ports are monitored to determine whether and when they change from an operational state to a non-operational state, or from a non-operational state to an operational state. If, for example, port X is initially in an operational state as shown on the left side of FIG. 1, but thereafter becomes non-operational, this change will be detected by the system. (It should be noted that most switches include code that monitors the state of each port so that the ports can operate independently—because this type of code is commonly known, it will not be described in further detail here.)

The concurrent polling and monitoring of the ports may be achieved using multiple processors, multi-tasking in a single processor, or any other suitable mechanism. (Because such mechanisms are well known in the art, they will not be discussed further here.) The modification of the polling instructions also occurs concurrently with the polling itself, so these operations can occur in real time while the system continues to route frames.

If port X becomes non-operational, no frames will appear at the port. Obviously, then, there will be no need to poll this port for frames that have to be routed. Consequently, instructions i through i+(n−1) are unnecessary and may be skipped or otherwise eliminated. In one embodiment, the first of these instructions (instruction i) is replaced by a branch instruction which has as a target the location of the first instruction corresponding to the next port to be polled. (The target of the branch instruction is the instruction to which execution branches—the next instruction to be executed.) Instructions i+1 through i+(n−1) are shown with a dashed outline to indicate that they will no longer be executed because of the branch in the code.

It should be noted that the converse situation may also occur. That is, port X may initially be non-operational, but may thereafter become operational. Accordingly, the CPU may initially execute code which resembles that illustrated on the right side of FIG. 1, wherein rather than polling port X, the CPU skips this port. When the system detects that port X has become operational, the branch instruction can be replaced by instruction i, so that instructions i through i+(n−1) will be sequentially executed to poll the port.

It should be noted that, when the system is initially powered up, it may handle each port in a predetermined manner, or it may poll all of the ports to determine whether they are operational or non-operational. In one embodiment, when the system is powered up, the ports may all be polled as if they are operational. Then, after the system begins operating, each of the ports is examined to determine whether it is non-operational. If a port is found to be non-operational, the corresponding polling code can be modified to skip the polling instructions for that port.

Figure 2:
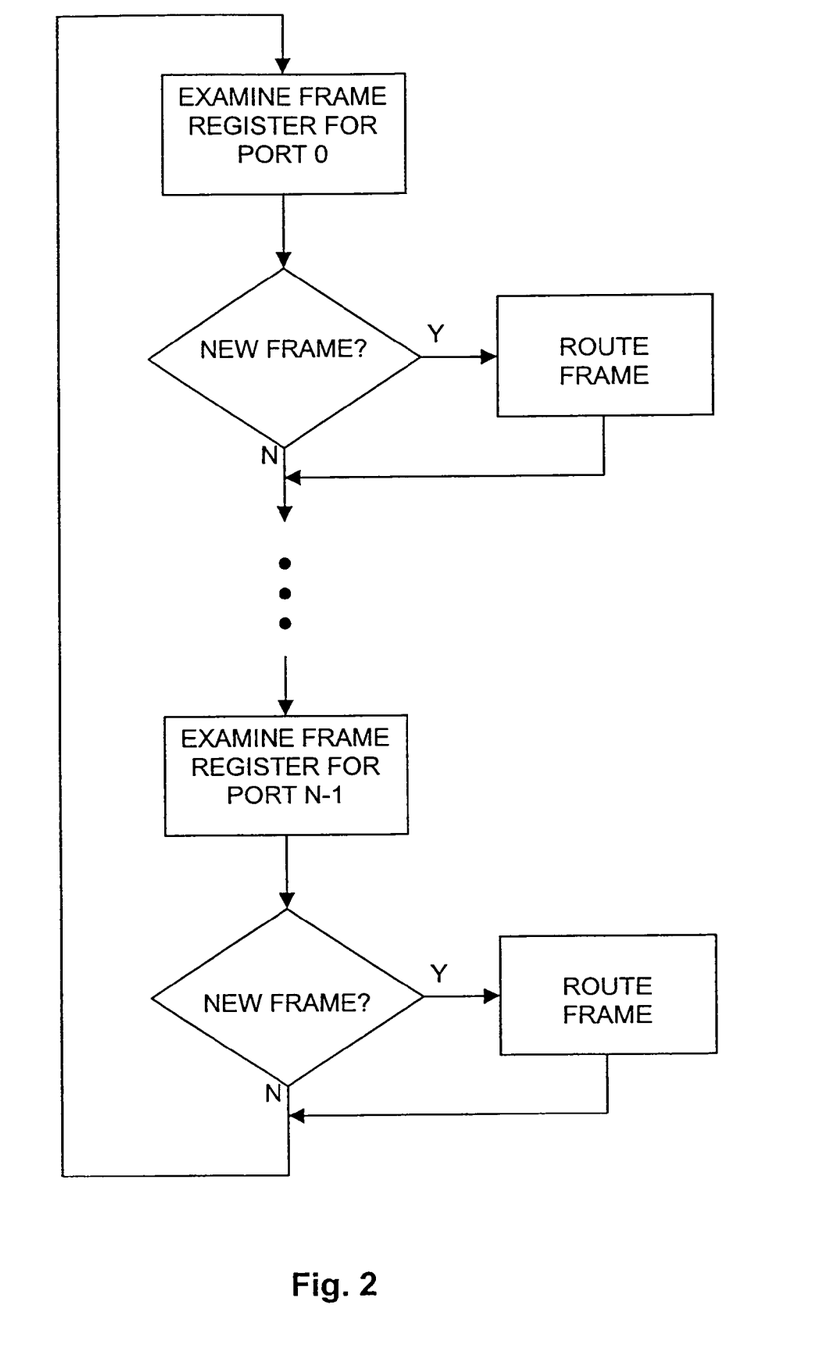
FIG. 2 is a flow diagram illustrating the polling of the ports and the routing of frames from those ports.

Referring to FIG. 2, a flow diagram illustrating the polling of the ports and the routing of frames from those ports is shown. This figure assumes that there are N ports, numbered 0 through N-1, each of which is operational. As noted above, each of the ports is polled to determine whether it has any frames to be routed. If there is no frame to be routed, the next port is polled. If there is a frame that has not yet been routed, the port routes the frame, then polls the next port to determine whether it has frames to be routed. This is repeated for each of the ports.

FIG. 2 illustrates the actions taken in polling the ports when all-of the ports are operational. It should be noted that, if one of the ports is found to be non-operational, all of the actions associated with that port will be eliminated. The system will write a branch instruction into the polling code so that the actions for the non-operational branch will be skipped. For example, if port 0 becomes non-operational, there would be no examination of the frame register for port 0, no test to determine whether there is a new frame, and no routing of a frame. After the polling of port N-1, the instructions will skip port 0 and proceed to poll port 1 (assuming, of course, that ports N-1 and 1 are operational).

Figure 3:
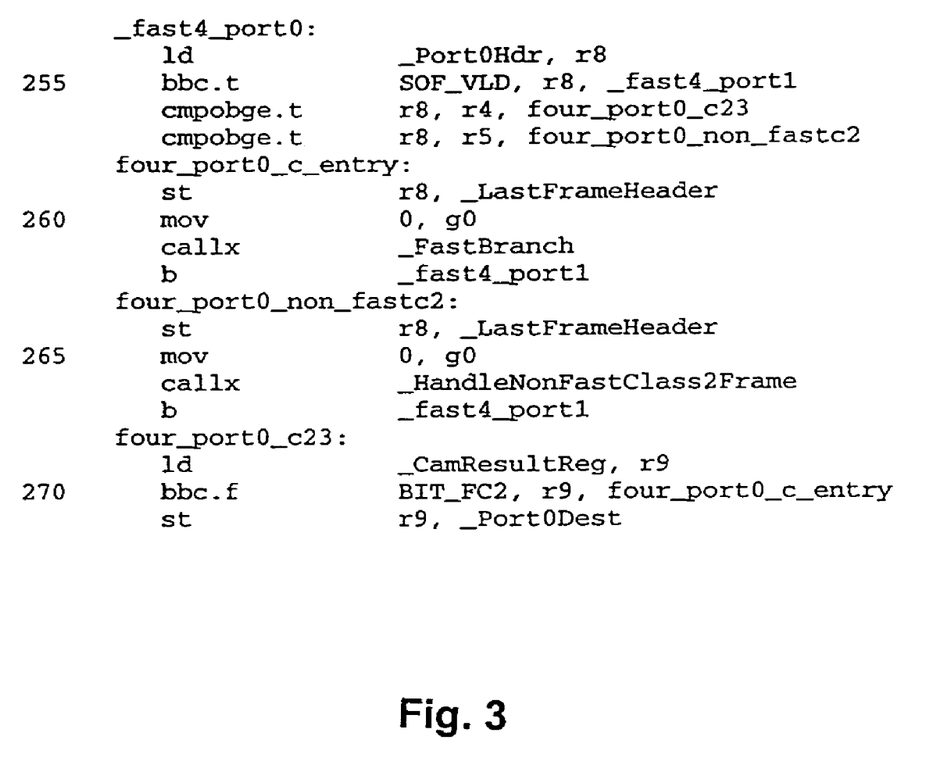
FIG. 3 shows the fast loop operating instructions that execute during the polling of the set of ports that are polled in one embodiment of the present invention.
Figure 4:
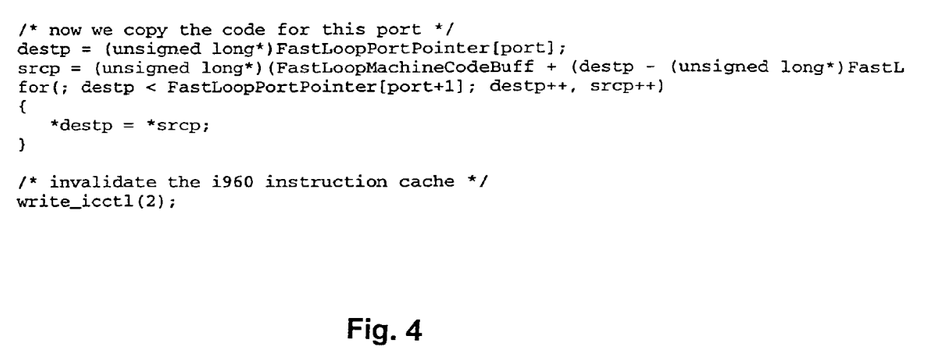
FIG. 4 illustrates instructions in one embodiment for adding a port according to the principles of the present invention.

FIG. 3 shows exemplary instructions for handling a four-port fast loop according to the teachings of the present invention. These instructions may be modified by the instructions as shown in FIGS. 3 or 4 to accommodate the addition or removal of ports to or from the system.

The flow diagram of FIG. 2 corresponds generally to the code shown in FIG. 3. FIG. 3 includes a portion of the instructions for polling and routing frames in a switch having four ports, so, in this instance, N in FIG. 2 would be 4. In the example of FIG. 3, the instructions for each port include four subgroups. For port 0, the subgroups are preceded by the labels "_fast4_port0", "four_port0_c_entry", "four_port0_non_fastc2" and "four_port0_c23". The first label, "fast4_port0", is followed by four instructions. These instructions read the frame header register and determine whether there is a frame at the port which needs to be routed. If there is not a frame, the instructions branch to the label "_fast4_port1", which identifies the beginning of the instructions for polling the next port. In other words, if there is no frame at port 0, the CPU skips the remainder of the instructions for that port and skips ahead to the instructions for port 1. If, on the other hand, there is a frame, the instructions determine the type of the frame and branch to an appropriate subset of instructions for routing the frame (the instructions following the label "four_port0_non_fastc2", the label "four_port0_c23", or the label four_port0_c_entry"). After the frame has been routed, the instructions corresponding to the next port (i.e., those following the label "_fast4_port1") are executed. For one type of frame, the instructions branch to the next port (from line 267 to line 273), and for the other type of frame, execution simply continues with the next instruction (line 271, then line 273).

As indicated above, if a port is polled and there is no frame at the port, the instructions branch to the next port, skipping the instructions which would have routed the frame. Thus, only two instructions are executed. Although only two instructions are executed in this scenario, these instructions are nevertheless unnecessary if it can be determined beforehand that no frame will be present at the port for routing. Execution of these instructions will do nothing but add to the latency of frames which are waiting at other ports. This latency is reduced in the present system by replacing the first of these two instructions with a branch instruction that causes execution to immediately jump forward to the next operational port.

Figure 6:
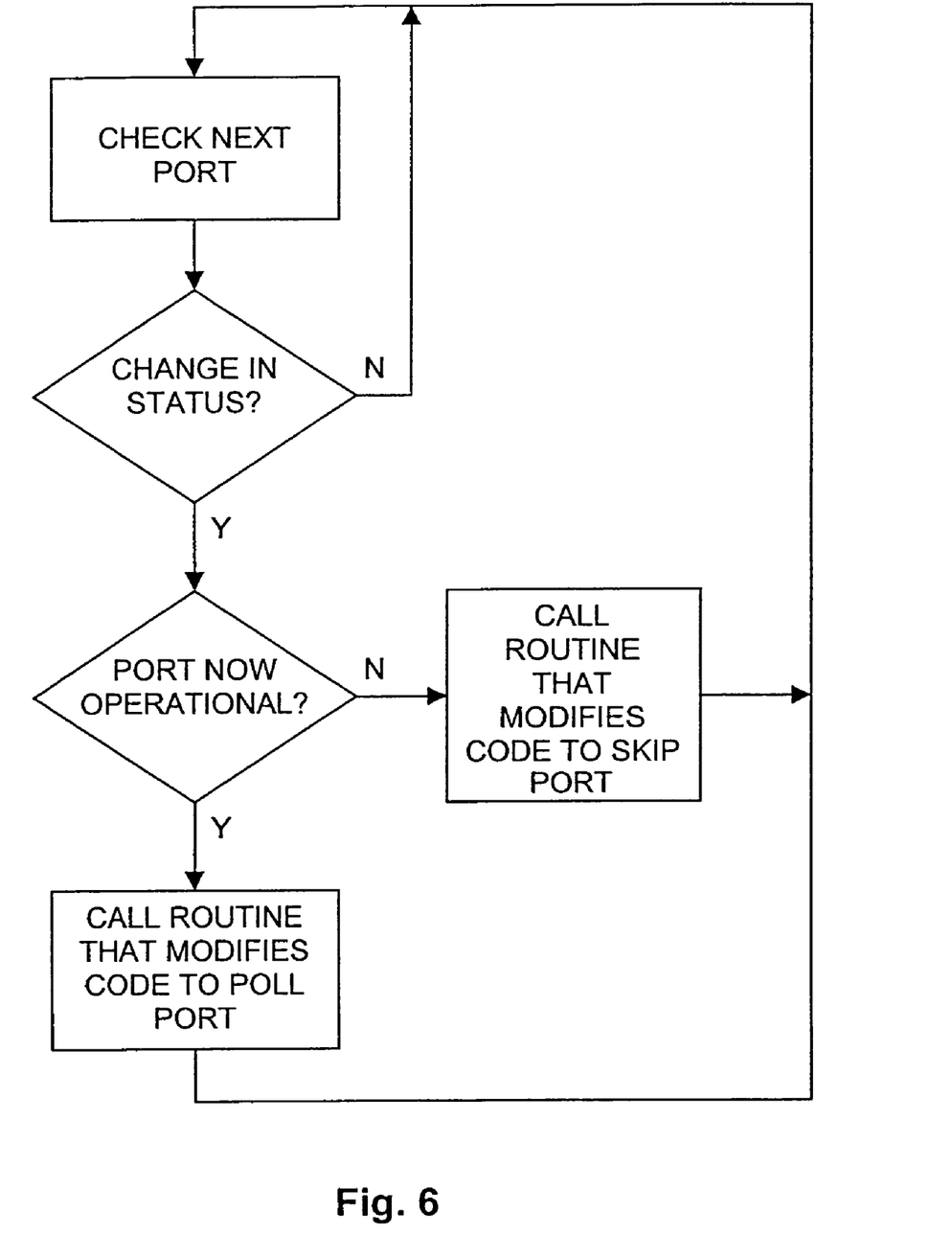
FIG. 6 is a flow diagram illustrating the method employed in one embodiment of the present system.

Referring to FIG. 6, a flow diagram illustrating the method employed in one embodiment of the present system is shown. This method is performed in parallel with the polling loop illustrated in FIG. 2. The ports in the system are repeatedly checked to determine whether there has been a change in the status of any of the ports. Beginning at the top of the figure, one of the ports is examined. If the status (operational or non-operational) of the port has not changed, the next port is checked. If there has been a change in status, the new status is determined. If the port is now operational, a routine is called to modify the polling instructions so that the port will be polled for frames. If the port is now non-operational, a routine is called to modify the polling instructions so that the port will be skipped (i.e. a branch to a subsequent instruction in the polling loop will be written into the polling code). After the code is modified, the next port is examined to determine if its status has changed, and the process repeats.

As indicated above, the modification of the polling code is predicated upon a change between an operational state and a non-operational state. In one embodiment, the difference between the operational and non-operational states is the level of functionality as compared to a predetermined level of functionality. If a port has less than the predetermined level of functionality, it is non-operational. If it has at least the predetermined level of functionality, it is operational.

While the particular definition of each of the operational and non-operational states may vary from one embodiment to another, they should focus on the ability of the corresponding port to receive frames which then need to be routed by the switch. Very simply, if the port is in a state in which it does not receive frames, it is non-operational for the purposes of being polled. It is not important that a port is non-operational for a particular reason. For example, the port may be damaged or it may not have a device connected to it. In both cases, the port does not have the threshold level of functionality required to receive frames and to therefore be considered operational.

Figure 5:
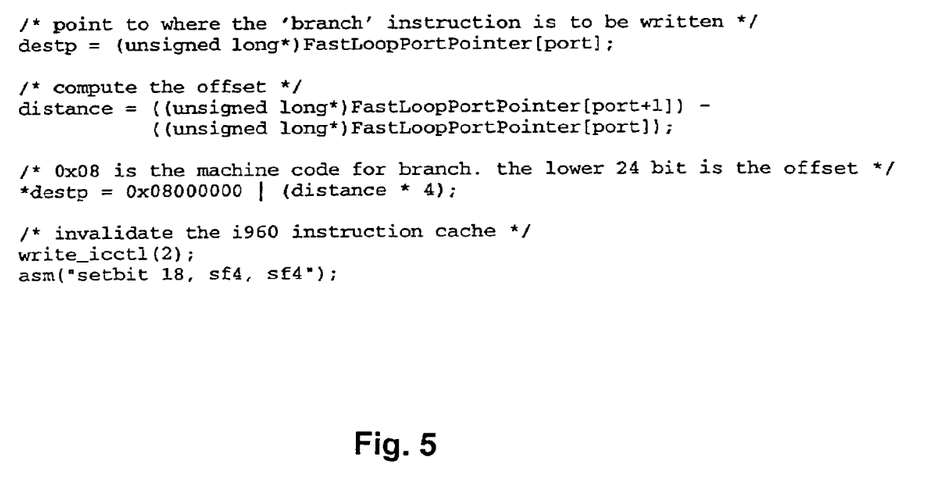
FIG. 5 illustrates the instructions that are employed in one embodiment of the present invention for removing a port.

Referring to FIGS. 3 and 4, the instructions which are used to modify the polling code of FIG. 3 are shown. The instructions shown in these figures are executed during normal operation of the system so that the required code modifications are handled automatically—no intervention by a system operator is necessary. FIG. 4 shows instructions which are used to modify the polling code to account for a previously non-operational port which has become operational. Conversely, FIG. 5 shows instructions which are used to modify the polling code to account for a previously operational port which has become non-operational. Since the code of FIG. 3 assumes that all four ports of the switch are operational, FIG. 5 will be discussed first.

The instructions which are shown at lines 631 through 639 control the modification of the polling code when one of the operational ports becomes non-operational. The instructions perform the following functions. First, a pointer ("destp") is set to point to the first line of the polling code corresponding to the port. Then, an offset is calculated between the first line of the polling code for the current port and the first line of the polling code for the next port. Finally, a branch instruction having the calculated offset it is written to the location of the first instruction in the polling code corresponding to the current port.

It should be noted that, in some systems, security mechanisms may be implemented to prevent instructions from being overwritten. These mechanisms may have to be disabled before the present system can be implemented. Because methods for disabling these mechanisms are well-known, they will not be described in detail here.

The address of the first line of polling code for each port is stored in the array of pointers "FastLoopPortPointer[ ]". Each element of this array is a pointer to an unsigned long integer (in this case, the location of the first line of polling code corresponding to one of the ports). The number of the port is stored in the variable "port" (e.g., for port 0, "port"=0), so FastLoopPortPointer[port] contains the address of the first polling instruction corresponding to the current port (where "current" refers to the port which has been identified as non-operational and for which the polling code must be modified).

The offset calculated above is the distance between the first instruction corresponding to the current port and the first instruction corresponding to a subsequent port. This distance is used with the branch instruction to indicate a target instruction (i.e., an instruction to which the branch instruction jumps). A binary OR operation is used to combine the branch op code and the offset into the single instruction that overwrites the polling code. When this instruction has been written into the polling code, the first instruction of the subsequent port will be executed immediately after the first instruction of the current port (i.e., the branch) is executed.

While the use of an assignment operator in line 639 may appear to simply set a variable ("destp") to a particular value, this instruction actually serves to copy the branch instruction to the location of the first instruction for the current port. Because the pointer "destp" is de-referenced (as indicated by the *), the value which represents the branch instruction is stored at the location indicated by the pointer rather than the location of the pointer itself.

The instructions which are shown at lines 584 through 590 control the modification of the polling code when one of the non-operational ports becomes operational. More specifically, these instructions are configured to overwrite the existing code for the newly operational port (e.g., a branch instruction) with instructions which are configured to enable polling of the port. The instructions at lines 584 through 590 performed the following functions: a destination pointer is set to point to the first instruction in the polling code corresponding to the current port; a source pointer is set to pointer to the first of several instructions stored in data memory which enable polling of a port; and the instructions are copied from the data memory into the polling code. (It should be noted that it is not necessary to store the new instructions in data memory—in other embodiments, instructions may be copied from other types memory, such as system firmware which is burned onto ROM memory chips.)

The destination pointer is set in the same manner as described above for overwriting a branch instruction onto the polling code. As noted above, the address of the first instruction in the polling code corresponding to the current port is stored in the "FastLoopPortPointer" pointer array. The value of the FastLoopPortPointer array element is assigned to the destination pointer (i.e., the address is stored in the destination pointer).

The source pointer is set in a manner which is similar to that used with the destination pointer. That is, the address of the first instruction to be copied into the polling code is stored in the source pointer. This address corresponds to a location in the data memory where the instructions are stored. The instructions are stored in data memory because they (as distinguished from copies of the instructions) are not intended to be executed. Further, because the instructions in the code which is actually executed may be overwritten, the data memory provides a location where the instructions will not be overwritten.

The instructions are copied from the data memory in essentially the same manner as the branch instruction. Because there are several instructions that will be copied, however, the copying instruction ("*destp=*srcp;") is placed within a loop. As each iteration of the loop is completed, the destination and source pointers are incremented. As a result, the instructions stored in consecutive locations in the data memory are copied to consecutive locations in the instruction memory. The instructions are copied as long as the address indicated by the destination pointer is less than the starting address of the next port's instructions. Thus, the instructions from the data memory overwrite the polling instructions for the current port, but not the next port.

It should be noted that some switches may incorporate instruction caches which are configured to store a number of recently-executed instructions. The purpose of the instruction cache is to store the instructions in a location which can be accessed more quickly than the main instruction memory. Because software applications often include instructions which are executed more than once in a relatively short period of time, the use of an instruction cache may reduce memory latency and improve performance.

If an instruction cache is used, the system checks the cache for instructions which need to be retrieved for execution, then checks the main instruction memory (or the next level in the memory hierarchy). Initially, there are no instructions in the cache, so the instructions are retrieved from memory. As the cache is populated with instructions, some of the instructions may be available from the cache. (Some instructions may not be available from the cache because it has a limited amount of space and older instructions may be bumped out of the cache to make room for more recent instructions.) If an instruction is in the cache, it is retrieved for execution from the cache instead of the memory.

Most systems do not modify the application code, but instead simply modify data which is used by the application code. Typically, therefore, there is no need to invalidate the instruction cache while an application is executing. In the present system, however, instructions may be modified. When an instruction is modified, there may be a copy of the unmodified instruction in the instruction cache. In order to prevent an unmodified instruction from being used when a modified instruction should be used, the instruction cache is invalidated every time one of the instructions is modified. (In alternative embodiments, it might be possible to invalidate only the cache line corresponding to the modified instruction.) Consequently, the system will retrieve the modified instruction from memory instead of using the unmodified instruction which was previously stored in the cache.

While one embodiment of the present invention has been described in detail, it should be understood that various changes, substitutions and alterations can be made to the above described system without departing from the spirit and scope of the invention as defined by the appended claims.

What is claimed is:

1. A method implemented in a switch having a plurality of ports, the method comprising:

executing a plurality of instructions for polling a set of operational ports to determine whether each of the operational ports has frames to be routed, wherein the operational ports are polled in a repeating sequential fashion;

examining the plurality of ports to identify one of the operational ports which becomes non-operational;

discontinuing polling of the non-operational port, wherein discontinuing polling of the non-operational port further comprises modifying a set of instructions corresponding to the identified non-operational port so that the identified non-operational port is not polled by replacing a first instruction within the set of instructions with a branch instruction which has as a target the location of a first instruction of a port to be polled after the identified non-operational port, wherein replacing the first instruction within the set of instructions corresponding to the non-operational port comprises replacing the first instruction with a new instruction that branches to the first instruction of the port to be polled and that indicates the offset to the next port to be polled, wherein the new instruction is formed by performing a binary OR operation on a branch op code and the offset between the first instruction in the set of instructions corresponding to the identified non-operational port and the first instruction in the set of instructions corresponding to the port to be polled, wherein the branch instruction causes execution of the plurality of instructions to jump to a set of instructions corresponding to a next port to be polled after the identified non-operational port; and continuing to execute the plurality of instructions.

2. The method of claim 1, further comprising monitoring the plurality of ports to detect changes in operational states of the plurality of ports.

3. The method of claim 1, further comprising examining the plurality of ports to identify a non-operational port which becomes operational;

modifying a set of instructions corresponding to the identified operational port so that the identified operational port is polled; and continuing to execute the plurality of instructions.

4. The method of claim 3, wherein prior to modification, the set of instructions corresponding to the identified operational port comprise a branch instruction followed by one or more additional instructions, wherein the branch instruction is configured to cause execution of the plurality of instructions to jump to a set of instructions corresponding to a subsequent port.

5. The method of claim 4, wherein modifying the set of instructions corresponding to the identified operational port comprises replacing the branch instruction with a replacement instruction, wherein the replacement instruction and the one or more additional instructions are configured to poll the identified operational port to determine whether the identified operational port has frames to be routed.

6. The method of claim 4, wherein modifying the set of instructions corresponding to the identified operational port comprises replacing the branch instruction and the one or more additional instructions with a set of replacement instructions configured to poll the identified operational port to determine whether the identified operational port has frames to be routed.

7. The method of claim 5, wherein replacing the branch instruction comprises writing a data value to the memory address in which the branch instruction is stored, wherein the data value comprises a binary representation of the replacement instruction.

8. The method of claim 1, further comprising invalidating at least a portion of an instruction cache after modifying the set of instructions corresponding to the identified non-operational port so that the identified non-operational port is not polled.

9. The method of claim 1, further comprising:

executing the plurality of instructions for polling a set of operational ports to determine whether each of the operational ports has frames to be routed, wherein the operational ports are polled in a repeating sequential fashion;

examining the plurality of ports to identify a non-operational port which becomes operational;

modifying the plurality of instructions to initiate polling of the previously non-operational port that becomes operational; and continuing to execute the plurality of instructions.

10. A method for decreasing routing latency of a switching platform, comprising the steps of:

monitoring a set of ports in the switching platform;

identifying ones of the set of ports that undergo a change of operational state; and modifying port control instructions associated with the identified ones of the set of ports to reflect current operational states of the identified ones of the set of ports;

wherein for each of the set of ports, if the port is operational, the modified port control instructions poll the operational port for frames to be routed, and if the port is non-operational, the modified port control instructions discontinue polling of the non-operational port, wherein discontinuing polling of the non-operational port further comprises modifying a set of instructions corresponding to the identified non-operational port so that the identified non-operational port is not polled by replacing a first instruction within the set of instructions with an instruction to branch to a subsequent port, wherein the branch instruction has as a target the location of a first instruction of a port to be polled after the identified non-operational port, wherein replacing the first instruction within the set of instructions corresponding to the non-operational port comprises replacing the first instruction with a new instruction that branches to the first instruction of the port to be polled and that indicates the offset to the next port to be polled, wherein the new instruction is formed by performing a binary OR operation on a branch op code and the offset between the first instruction in the set of instructions corresponding to the identified non-operational port and the first instruction in the set of instructions corresponding to the port to be polled, wherein the branch instruction causes execution of the plurality of instructions to jump to a set of instructions corresponding to a next port to be polled after the identified non-operational port; and continuing to execute the plurality of instructions.

11. The method of claim 10 wherein ports having a level of functionality below a predetermined threshold level are considered non-operational and ports having a level of functionality at or above the predetermined threshold level are considered operational.

12. A network switch comprising:

a plurality of ports, wherein each of the plurality of ports has an associated state, wherein the state of each of the plurality of ports can be either operational or non-operational, wherein ports in the operational state are configured to receive frames for routing and wherein ports in the non-operational state do not receive frames for routing;

at least one CPU, wherein the at least one CPU is configured to execute a polling loop, wherein the polling loop contains instructions corresponding to each of the plurality of ports, wherein the instructions are configured to poll each operational port and to discontinue polling of each non-operational port, and further wherein the at least one CPU is configured to monitor each of the plurality of ports to identify ones of the plurality of ports that have a change of state and to modify the instructions in the polling loop to poll the identified ports if the identified ports become operational and to discontinue polling of the identified ports if the identified ports become non-operational, wherein discontinuing polling of the non-operational port further comprises modifying a set of instructions corresponding to the identified non-operational port so that the identified non-operational port is not polled by replacing a first instruction within the set of instructions with an instruction to branch to a subsequent port, wherein the branch instruction has as a target the location of a first instruction of a port to be polled after the identified non-operational port, wherein replacing the first instruction within the set of instructions corresponding to the non-operational port comprises replacing the first instruction with a new instruction that branches to the first instruction of the port to be polled and that indicates the offset to the next port to be polled, wherein the new instruction is formed by performing a binary OR operation on a branch op code and the offset between the first instruction in the set of instructions corresponding to the identified non-operational port and the first instruction in the set of instructions corresponding to the port to be polled, wherein the branch instruction causes execution of the plurality of instructions to jump to a set of instructions corresponding to a next port to be oiled after the identified non-operational port.

13. The switch of claim 12, wherein the at least one CPU is configured to determine that ones of the plurality of ports which have a level of functionality below a predetermined threshold are non-operational and to determine that ones of the plurality of ports which have a level of functionality at or above a predetermined threshold are operational.

14. The switch of claim 13, wherein the switch is operable to work in a fibre channel network.

15. The switch of claim 14, wherein upon detection of a port which has become non-operational, the at least one CPU is configured to overwrite a first one of the instructions corresponding to the detected port with a branch instruction, wherein the branch instruction includes a target address of a first one of the instructions in the polling loop corresponding to a subsequent port.

16. The switch of claim 12, wherein the CPU is further operable to:

execute the plurality of instructions for polling a set of operational ports to determine whether each of the operational ports has frames to be routed, wherein the operational ports are polled in a repeating sequential fashion;

examine the plurality of ports to identify a non-operational port which becomes operational;

modify the plurality of instructions to initiate polling of the previously non-operational port that becomes operational; and continue to execute the plurality of instructions.

17. The method of claim 12 wherein ports having a level of functionality below a predetermined threshold level are considered non-operational and ports having a level of functionality at or above the predetermined threshold level are considered operational.

* * * * *